(12) United States Patent
Renna et al.

(10) Patent No.: US 8,147,120 B2
(45) Date of Patent: Apr. 3, 2012

(54) DISPOSABLE SHAKER

(75) Inventors: Egidio Renna, Naples (IT); Roberto Marino, Cusano Milanino (IT)

(73) Assignee: Club Seven S.r.l., Milan (IT)

( * ) Notice: Subject to any disclaimer, the term of this patent is extended or adjusted under 35 U.S.C. 154(b) by 0 days.

(21) Appl. No.: 12/867,789

(22) PCT Filed: Feb. 18, 2009

(86) PCT No.: PCT/IB2009/005283
§ 371 (c)(1),
(2), (4) Date: Aug. 16, 2010

(87) PCT Pub. No.: WO2009/104099
PCT Pub. Date: Aug. 27, 2009

(65) Prior Publication Data
US 2010/0315897 A1    Dec. 16, 2010

(30) Foreign Application Priority Data

Feb. 19, 2008  (IT) .............................. CO2008A0005

(51) Int. Cl.
*A47J 43/27* (2006.01)
(52) U.S. Cl. .................. 366/130; 206/222; 215/DIG. 8; 220/568
(58) Field of Classification Search .................. 366/130; 206/222; 215/DIG. 8; 220/568; 241/168, 241/169, 169.2, 274, DIG. 17
See application file for complete search history.

(56) References Cited

U.S. PATENT DOCUMENTS

| | | | | |
|---|---|---|---|---|
| 3,240,391 A | * | 3/1966 | Garton | 222/80 |
| 3,339,802 A | * | 9/1967 | Weiner et al. | 222/82 |
| 3,347,410 A | * | 10/1967 | Schwartzman | 222/80 |
| 3,349,966 A | * | 10/1967 | Schwartzman | 222/80 |
| 3,521,745 A | * | 7/1970 | Schwartzman | 206/222 |
| 3,548,562 A | * | 12/1970 | Schwartzman | 53/440 |
| 4,103,772 A | * | 8/1978 | Wiegner | 206/222 |
| 4,174,035 A | * | 11/1979 | Wiegner | 206/222 |
| 4,193,698 A | * | 3/1980 | Gartner | 366/130 |
| 4,408,690 A | * | 10/1983 | Ferrero | 206/222 |
| 5,273,190 A | * | 12/1993 | Lund | 222/83 |
| 5,419,429 A | * | 5/1995 | Zimmerman et al. | 206/222 |

(Continued)

FOREIGN PATENT DOCUMENTS

DE    103 23 608 A1    12/2004

(Continued)

OTHER PUBLICATIONS

International Search Report, dated Sep. 2, 2009, from corresponding PCT application.

*Primary Examiner* — Charles E Cooley
(74) *Attorney, Agent, or Firm* — Young & Thompson

(57) ABSTRACT

A disposable shaker (1) made of synthetic material having a cup-like cover (3) and a cup-like base (2) which can be removably connected together and have or form the one or the other (2; 3) a container with a plurality of bins (4) which contain the ingredients for a desired cocktail and are closed by a membrane (6) which is tearable by means of tearing teeth (7) in one-piece with said cover (3) or base (2) inside thereof. In a preferred embodiment the shaker (1) is provided with unambiguous guiding manipulation means (20) for the membrane tearing stroke and shaker opening stroke after the mixing or shaking phase for the cocktail preparation.

12 Claims, 10 Drawing Sheets

U.S. PATENT DOCUMENTS

| | | | | |
|---|---|---|---|---|
| 5,586,676 | A * | 12/1996 | Lynd | 220/212 |
| 6,726,005 | B2 * | 4/2004 | Lentine | 206/222 |
| 7,192,179 | B2 * | 3/2007 | Angeletta | 366/130 |
| 7,216,761 | B2 * | 5/2007 | de Vries | 206/222 |
| 7,959,346 | B2 * | 6/2011 | Loden | 366/130 |
| 2003/0047468 | A1 * | 3/2003 | Lentine | 206/222 |
| 2005/0007871 | A1 * | 1/2005 | Angeletta | 366/130 |
| 2005/0161466 | A1 | 7/2005 | McGlothlin et al. | |
| 2007/0211563 | A1 * | 9/2007 | De Vries | 366/139 |
| 2007/0246381 | A1 * | 10/2007 | Pond | 206/222 |
| 2010/0206174 | A1 * | 8/2010 | Loden | 99/275 |
| 2010/0258457 | A1 * | 10/2010 | Seelhofer | 206/222 |
| 2010/0315897 | A1 * | 12/2010 | Renna et al. | 366/130 |
| 2011/0180545 | A1 * | 7/2011 | Marino et al. | 220/568 |

FOREIGN PATENT DOCUMENTS

| | | |
|---|---|---|
| FR | 2694542 A1 * | 2/1994 |
| FR | 2 751 860 A1 | 2/1998 |
| GR | 870 606 B | 4/1987 |
| IT | RM940358 | 12/1995 |
| IT | 1298721 | 2/2002 |
| WO | WO 9113007 A2 * | 9/1991 |
| WO | 2009/104099 A2 * | 8/2009 |

* cited by examiner

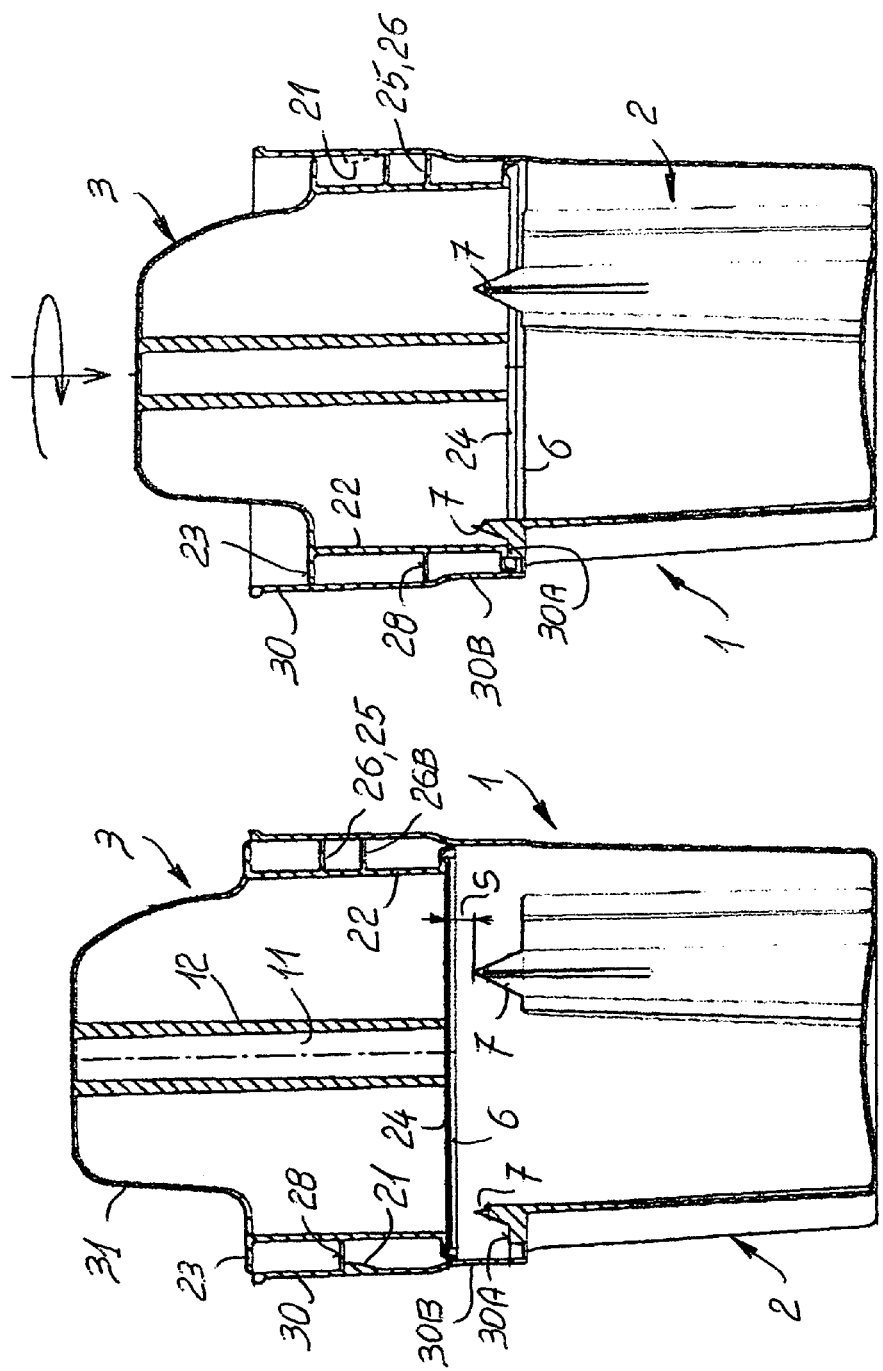

US 8,147,120 B2

DISPOSABLE SHAKER

TECHNICAL FIELD

The present invention relates to a disposable shaker with a cup-like base part and a cup-like cover part which are removably joinable together with an axial snap engagement or with a rotatable engagement.

BACKGROUND OF THE INVENTION

Disposable shakers are known in several embodiments.

The Italian patent application RM94A000358 discloses a shaker consisting of several parts and formed by an upper cover part 1, a lower part 2 having a plurality of bins 4 for housing the single cocktail ingredients, and a membrane 3 which may be fixed to the upper part of the lower part after having inserted said different cocktail ingredients in said single bins 4. The coupling between upper part and lower part takes place by means of pressure or a thread or bayonet closure. The shaker consists of synthetic material. This embodiment has the disadvantage of requiring a long manipulation as well as a preliminary opening of the shaker before to prepare a cocktail. In fact said manipulation comprises a first step for opening the shaker, a second step for removing the membrane, a third step for closing again the shaker, a further agitation or shaking step, and a last shaker opening step in order to drink the prepared cocktail. Therefore are considered drawbacks the manual removing of the membrane as well as the temporary access to the bins 4 before the step for closing again the shaker, wherein during said free access time there is obviously the improper possibility for thirds to introduce undesirable substances in said bins.

The IT-A-1.298.721 discloses a similar disposable shaker in which in the base part thereof is removably housed a multibin container. This embodiment has the same drawbacks of the shaker disclosed by the Italian patent application No. RM94A 000358 with additionally the disadvantage of requiring an additional component, that is a removable multibin container and, therefore, of requiring a greater quantity of synthetic material and higher costs.

The document FR-A-2 751 860 discloses a cartridge intended for packaging a cocktail. The cartridge described herein is cylindrical-shaped with several tubular parts arranged axially, i.e. a cover part (A), two intermediate parts (I and K) associated to a disc with tearing duct s facing towards the cover, as well as a mixing cup part (L), having a chamber (M) for a piece of ice as well as a mixing element (R), wherein accommodated between the intermediate piece (I) and the cover (A) is a group (E) formed by cartridges each containing an ingredient of the cocktail provided for, closed at the ends by means of the membrane (F and G) and containing an eccentric duct (O) having a lower end fixed against the disc (H) and projecting with the other end from the cover (A) for pouring the cocktail obtained. The cover (A) in turn has an upper part with tearing ducts (C) projecting downwards and, peripherally, an opening (B) for the passage of air. The group formed by the cartridges (E) and by the through duct (O) can be closed by an openable ring (J). In practice, by axially pressing the cover (A) downwards there occurs the tearing of the upper (F) and lower (G) membranes of the cartridges (E) and, the air flowing in through the opening (B) allows releasing the components of the cocktail into the mixing cup-like base part (L), wherein after the mixing, cooled by the piece of ice, the cocktail may be poured out through the pouring duct (O), which is closable by means of the cap (P). A straw may be also introduced through said through duct (O).

The description above shows that the shaker disclosed in the is document FR-A-2 751 860 has various and serious disadvantages. First and foremost, it requires three parts associable in a sliding manner, as well as the use of a container with several compartments, i.e. with several cartridges, associated to the through duct, as well as a closure ring, alongside the tearing teeth at both ends of the cartridges, with respective openable ring. This implies considerable extension axially with respect to the shaker, as well as an extensive use of synthetic material. A further disadvantage lies in the fact that it requires a high number of moulds as well as a long period of assembly. Another disadvantage lies in the poor exploitation of the inner space of the shaker intended for accommodating the separate liquors, i.e. the components of the cocktail.

The high disproportion in weight between the required synthetic material and the contents of the shaker, i.e. the so-called "overpackaging", would not allow—not even currently—the use of such disposable shaker in various countries, such as for example Great Britain.

According to the title of the document DE 103 23 608 A1 the latter discloses an "Arrangement with a container for housing a beverage". Different embodiments are shown which consists of several parts or components, for example 4 components, that is, (for example in FIGS. 8a, 8b, 9, 10, 11a, 11b): 1) a container (2, 52, 64) having at least a tearable wall (membrane) (8, 56) for housing a beverage, 2) a ring-shaped means (4, 26, 36, 44, 70) having teeth (30, 72) for tearing said tearable wall (8, 56), 3) a below lying receptacle (6, 42, 60, 74) for drinking or mixing the beverage which is fallen therein by gravity after the tearing of the tearable wall, and 4) a cap (for example 73 in FIG. 8a).

The shown arrangements (shakers) have each a more or less complicated manipulation which requires an intermediate opening thereof and also the presence of parts which are to be removed from said arrangements before drinking the prepared beverage or cocktail.

Therefore, the illustrated arrangements comprising a plurality of components have practically substantially the disadvantages of the prior art shakers which are avoided by the shakers in two components according to the present invention.

SUMMARY OF THE INVENTION

Accordingly, the aim of the present invention is to overcome the drawbacks of the prior art shakers and to provide disposable shakers which allow a cocktail preparation with a manipulation which is easy, quick and does not require a preliminary opening of the shaker, and this with a limited number of components.

The above aim is achieved by a disposable shaker comprising a cup-like base part (2) and a cup-like cover part (3) which are removably joinable together with an axial snap engagement or with a rotatable engagement, for example a thread engagement, one of said cover (3) or base (2) houses or forms a multibin container (9) which may be tightly closed by means of a membrane (6) and serves for housing the single ingredients of a cocktail or liquid mixture to be prepared, wherein tearing teeth (7) for tearing said membrane (6) during said engagement between said cover part (3) and said base part (2) are provided, characterized in that said membrane (6) closing said multibin container (3; 2) is fixed to the latter, and in that said tearing teeth (7) for tearing said membrane (6) are formed in one-piece with in said base part (2) or cover part (3) and having tearing points near said membrane (6) in the closed or assembled position of said shaker (1) so that an axial and/or rotational mutual translation movement between said cover (3) and base (2) causes a penetration of said tearing teeth (7) into said membrane (6) with a consequent known tearing of the latter (6) and transfer of the cocktail ingredients, which are directly or indirectly contained in the bins (4) of said cover (3) or base (2), into the respective other mixing part (2; 3) of said shaker (1) for the mixing or shaking of said ingredients into said shaker.

Further developments of the disposable shakers according to the invention are defined in the depending claims.

The shakers according to the invention provide several and important advantages.

First of all for the preparation of a cocktail is avoided an intermediate opening of the shaker and the necessary time is reduced, wherein at the same time is surely avoided an access to thirds to the bins containing the cocktail ingredients during the cocktail manipulation for the cocktail preparation. The time necessary for the preparation of cocktails is reduced. The teeth for tearing the membrane are obtained in one piece in the cover or in the base of the shaker, wherein in said last case the tearing teeth are placed in such a way that they are not at all sensed by the user when he/she drinks the cocktail.

An advantage concerning the shaker construction is to be seen in the fact that the number of the molds necessary for the production of the shaker is reduced, and this together with a reduced time for the shaker assembling contributes to reduce the manufacturing costs. Said manufacturing costs are further reduced for the fact that the quantity of synthetic material necessary for the molding of the shaker, that is the weight of the latter, are reduced.

Still another advantage is to be seen in the fact that the production of the shaker in two parts is adapted, without particular modifications, to a grater sizing of the shaker provided for containing, for example, drinks, the so-called "long drinks", which are known in the more different sport sectors, as for example for cyclists, as integrators in gym activities, and so on.

The proposed shakers are likewise suitable for a conformation having a base in the form of a "coffee cup" in the case of drinks to be mixed, as coffee with cognac and vanilla or ginseng, for "cappuccino" with or without cocoa and sugar, and so on.

Another important advantage is that are provided means adapted to allow an easy and unambiguous manipulation and to is avoid an accidental tearing of the membrane before the use as well as to guarantee a reliable tightness during the mixing or shaking phase, and to allow an easy opening of the shaker.

BRIEF DESCRIPTION OF THE DRAWINGS

Further characteristics, advantages and details of the disposable shakers according to the invention will become more apparent hereinafter from the following disclosure of some preferred embodiments which are exemplary and schematically illustrated in the accompanying drawings in which said embodiments are shown in convenient scales for an easier understanding of the characteristics thereof, and in which, FIGS. 24 and 25 show in a middle vertical section the shaker of FIGS. 20-23 in the preassembled or selling position in FIG. 24 and after the membrane tearing in FIG. 25, respectively.

DESCRIPTION OF THE PREFERRED EMBODIMENTS

Figure 3:
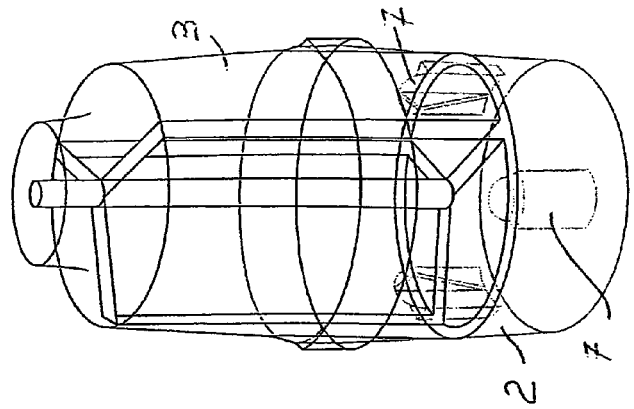
FIG. 3 shows the shaker of FIG. 1 after the relative movement between cover part and base part (through axial push or rotation), that is with the tearing teeth entered inside the bins after having perforated the membrane.
Figure 2:
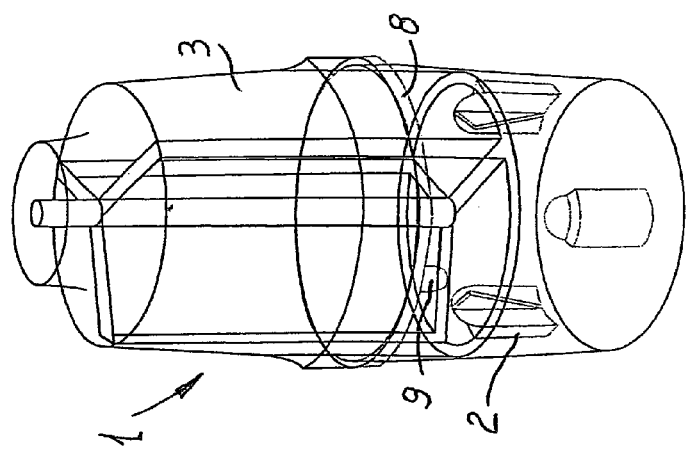
FIG. 2 shows the shaker of FIG. 1 in the preassembled closed condition, that is the selling closed condition.
Figure 1:
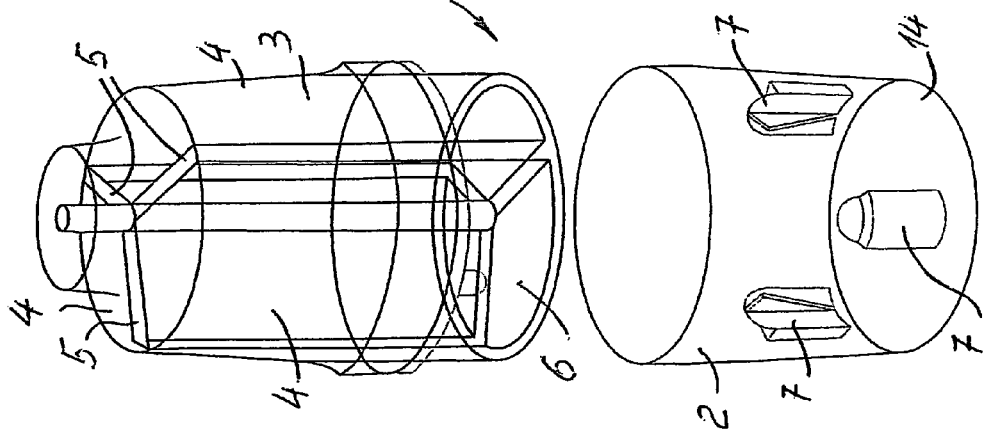
FIG. 1 is a perspective exploded view of a first embodiment of a disposable shaker according to the invention.

Reference is first made to the disposable shaker made of synthetic material shown in the FIGS. 1 to 3 and denoted as a whole by 1. In this embodiment the shaker 1 comprises a cup-like base part 2 and a cover part 3 having inside more bins 4, wherein in the shown example three bins 4 are provided which are delimited by three partition walls 5 and serve for containing three spirits or liquid ingredients for the preparation of an in itself known cocktail or for containing for example two liquid ingredients and a powder-like ingredient, for example an integrator for preparing a drink or a liquid mixture with integrators, wherein said ingredients are tightly contained in the respective bins by means of a membrane 6 which is fixed, for example thermowelded or tightly glued to the bottom of the cover part 3 which bottom is conformed as an annular flange.

In the cup-like base 2 are provided tearing teeth 7 which are one-piece with the internal surface of said base 2 near the bottom of the latter. The opposite ends of said cover 3 and base 2 are provided in a known manner with known engagement means as axial push means or revolving thread means for example of the bayonet type which are not illustrated in detail and allow a preassembled closure or selling closure (FIG. 2) between cover 3 and base 2 and a following tearing movement for tearing said membrane 6 in order to prepare the cocktail which movement is carried out by means of an axial squashing push or approach through rotation between cover 3 and base 2. Before carrying out said reciprocal movement between cover 3 and base 2 it will be necessary to tear away from the packaging a circumferential guarantee strip 8 acting on the grasping tongue 9 thereof, wherein said strip 8 covers an area between the lower end of the cover 3 and the underlying base 2 in the preassembled position.

Figure 4:
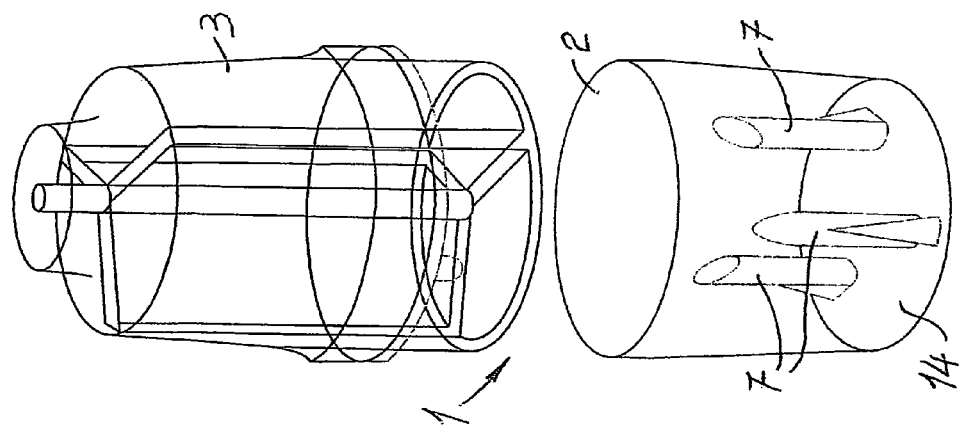
FIG. 4 shows a second embodiment in an exploded view, similar to FIG. 1 but with a different conformation of the tearing teeth.
Figure 5:
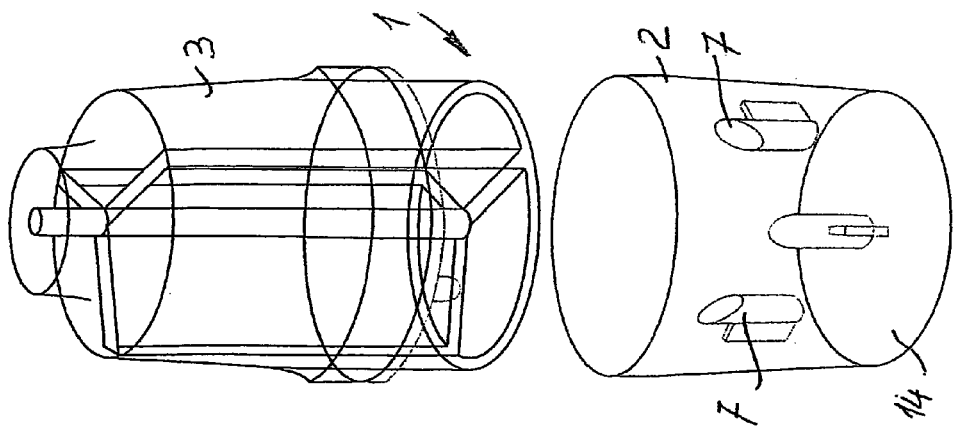
FIG. 5 shows a further embodiment of the shaker in an exploded view as in the FIGS. 1 and 4 but with a still different conformation of the tearing teeth.

The embodiments shown in the FIGS. 4 and 5 differ from the embodiment according to the FIGS. 1 to 3 only for a different configuration of the tearing teeth 7. For example, the tearing teeth 7 of FIGS. 4 and 5 are cylindrical along a vertical axis with a beveled top edge.

Figure 7:
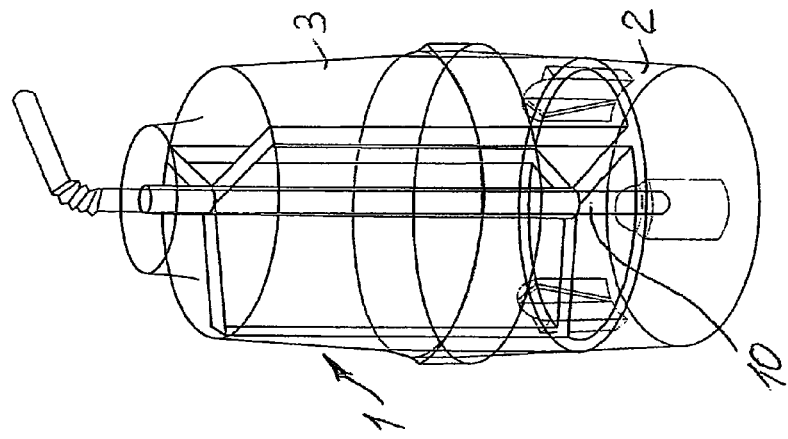
FIG. 7 shows the shaker of FIG. 6 in the closed position for a cocktail preparation with an inserted straw for drinking a cocktail or liquid mixture in the shaker.
Figure 6:
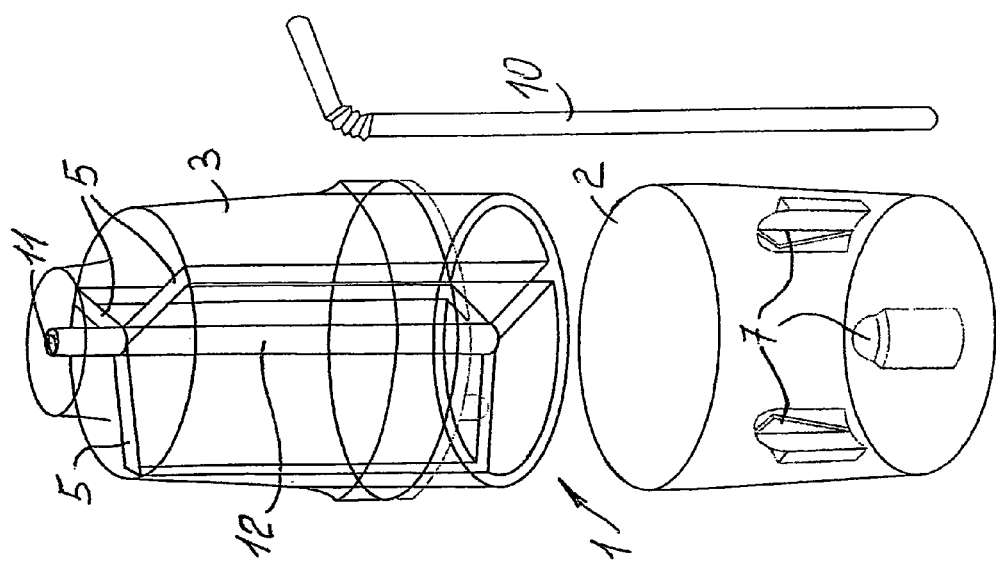
FIG. 6 shows in an exploded view a further embodiment of a shaker conformed for receiving a straw.

The embodiment illustrated in the FIGS. 6 and 7 differs for the fact that the cocktail may be drunk by means of a straw 10 which may be inserted in the shaker trough the hole 11 provided in the axial column 12 obtained in one-piece with the partition walls 5.

Figure 10:
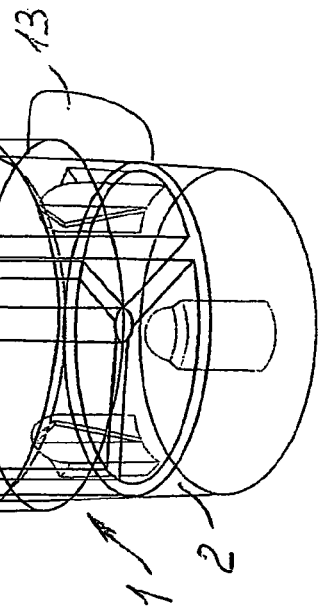
FIGS. 8, 9 and 10 show a disposable shaker with a base part in the form of a small cup, that is in the exploded position in FIG. 8, in the preassembled or selling position in FIG. 9, and in the closed position for preparing the desired liquid mixture in FIG. 10, respectively, The FIGS. 11, 12 and 13 show an embodiment of the shaker in an enlarged form, that is in a bottle-like form, in an exploded position in FIG. 11, in the preassembled position in FIG. 12, and in the use position in FIG. 13, respectively, wherein the cover part may be provided with a push-pull plug or the like and with tearing teeth in the upper cup-like cover part.
Figure 9:
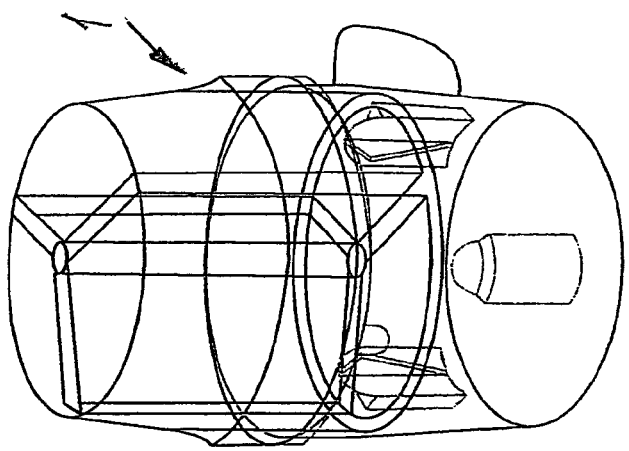
Figure 8:
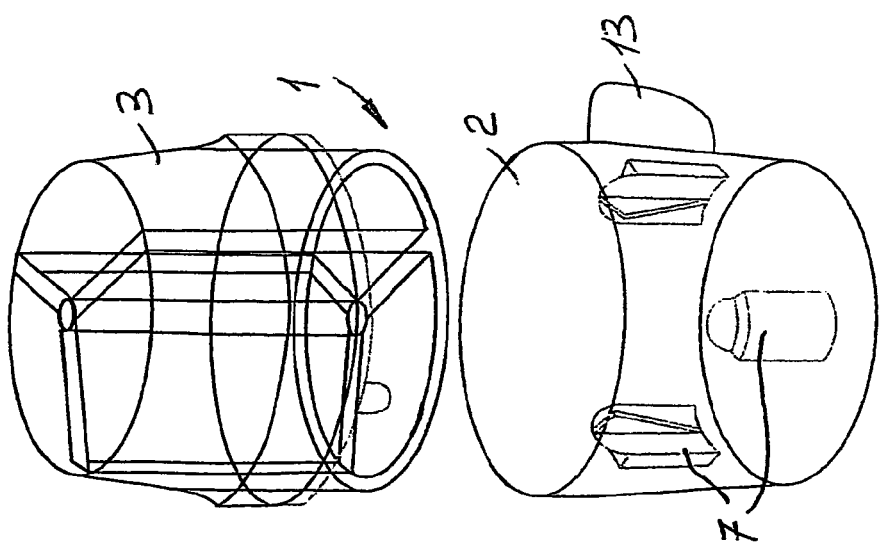

In the FIGS. 8 to 10 is shown a disposable shaker 1 having the cup-like base 2 in the form of an "espresso cup" provided with a projecting handgrip 13 having a shape at will. This embodiment is provided for the preparation of drinks to be mixed like coffee with cognac and vanilla, "cappuccino", and so on.

The different embodiments shown in the FIGS. 1 to 10 have tearing teeth 7 obtained in one-piece either with the internal surface of the cup-like base 2 or with the bottom 14 thereof.

In the following embodiments illustrated in the FIGS. 11 to 16 said tearing teeth 7 are obtained in one-piece with the internal surface of the cover part 3 whereas the partition in more bins 4 is provided in the lower part or base 2.

Figure 13:
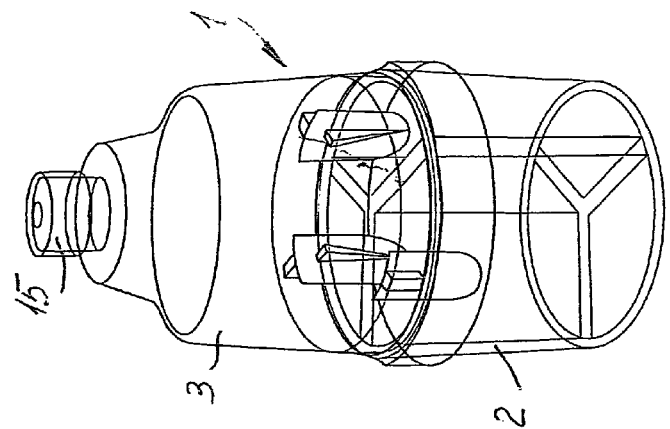
Figure 12:
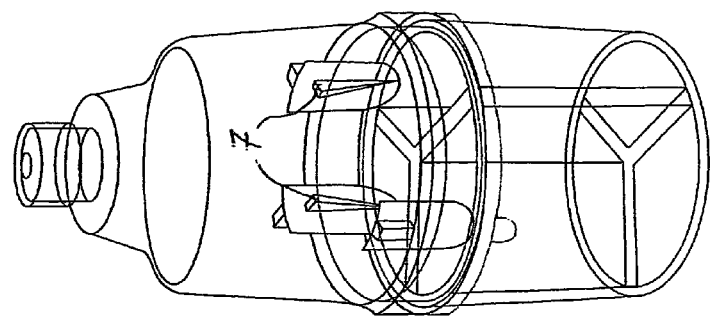
Figure 11:
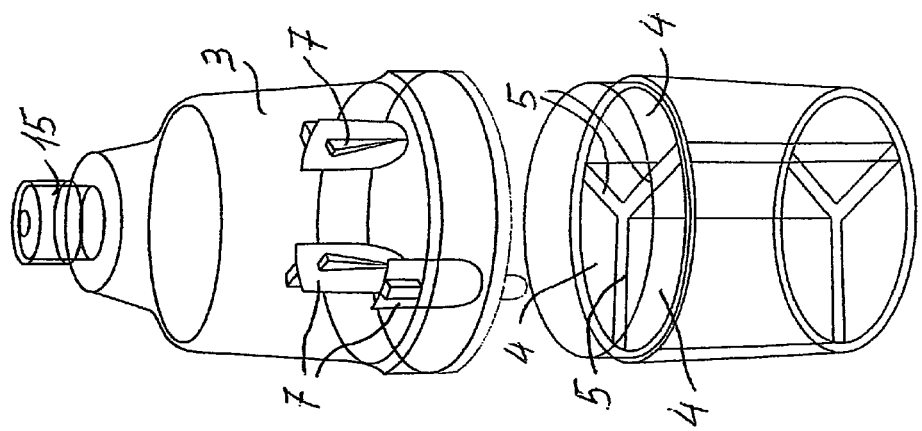

The embodiment of the FIGS. 11 to 13 is carried out with a greater size or in a bottle-like form in order to contain components for making drinks made, for example, of water with integrators and the so-called "long drinks", that is drinks with integrators known in particular in sport sectors, for example for cyclists, in gyms and so on, wherein 15 denotes a plug for direct drinking said drinks or "long drinks", for example a push-pull plug.

According to the teaching of the present invention it is also possible to use plugs containing a substance which may be released by the user, for example a substance containing integrators, energy giving agents, and so on.

Figure 14:
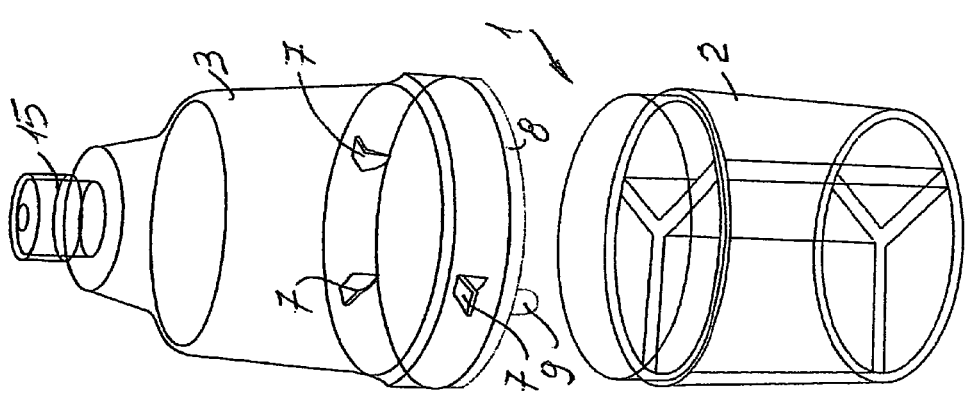
FIG. 14 shows a further form of a bottle-like shaker having a different conformation of the tearing teeth.

The embodiment shown in FIG. 14 differs from the embodiment of the FIGS. 11 to 13 for a different hook-like shape of the tearing teeth.

Figure 16:
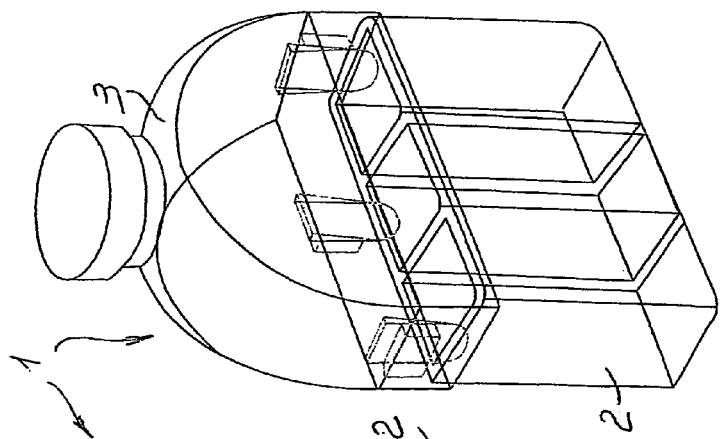
FIGS. 15 and 16 show a further shaker conformation in the form of a little flat bottle in the exploded view in FIG. 15 and in the preassembled or selling position in FIG. 16, respectively.
Figure 15:
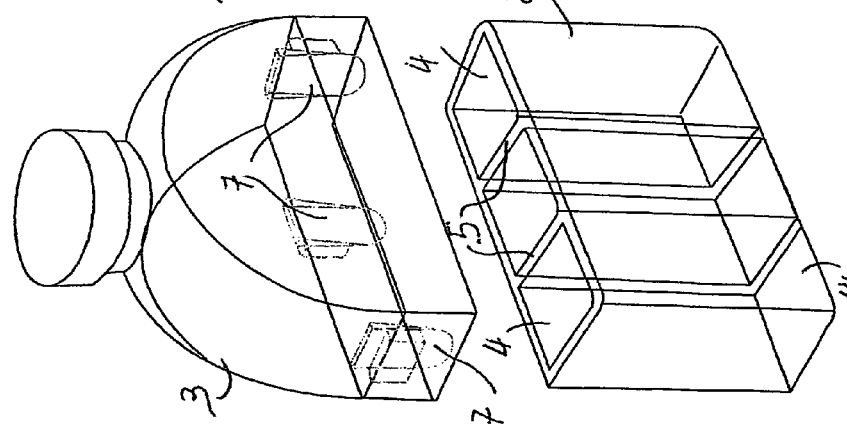

The FIGS. 15 and 16 illustrate a further embodiment of a shaker as a flat bottle-like shaker having a cover part 3 and a base part 2. The single bins 4 have in this case a quadrangular shape. Like the preceding embodiments, the single bins 4 are closed by a thermowelded or glued membrane 6.

All the embodiments have the common feature of being formed by only two parts 2, 3 which may be axially inserted the one into the other by means of either an axial thrust action or a rotational thread engagement.

Figure 18:
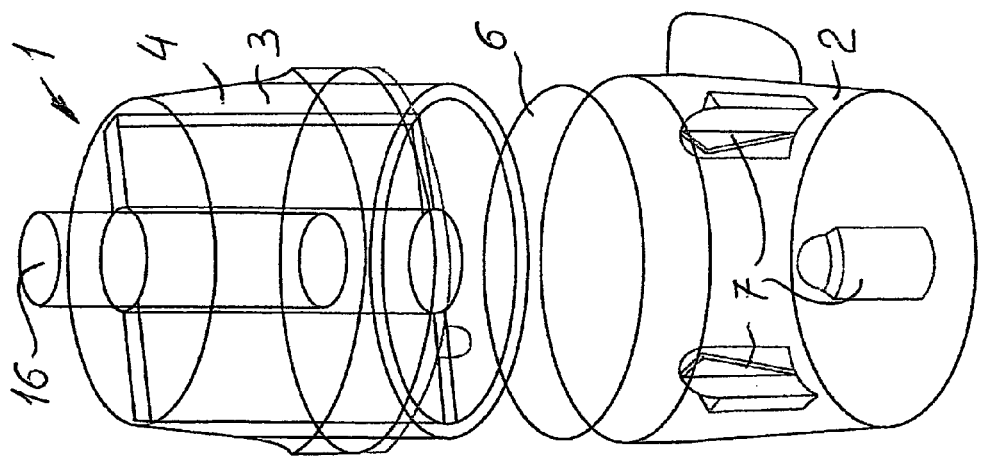
FIGS. 17 and 18 show in exploded views respectively two examples of shakers in which in the multibin container is also housed a removable container.
Figure 17:
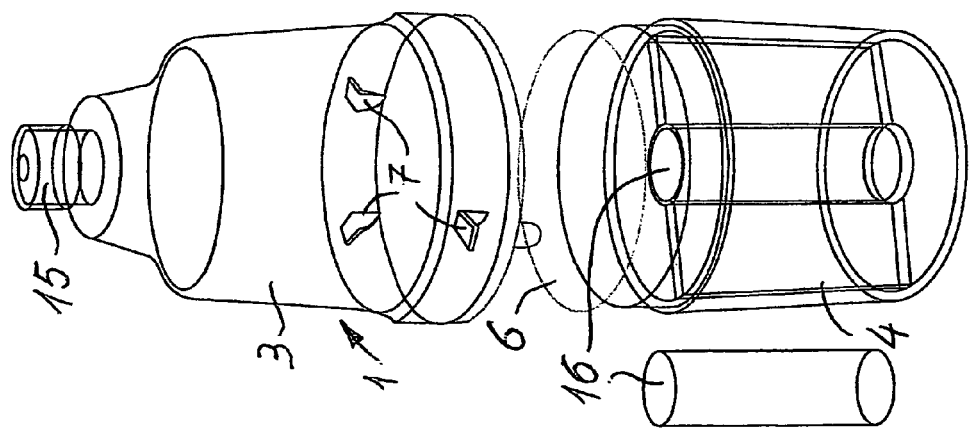

Furthermore, in the shakers 1 of the FIGS. 17 and 18 in the middle of the respective container having more bins 4 is provided a further container 16 which is removable, has for example a cylindrical shape and contains a further component, for example a component conferring fluorescence and similar luminous aspects to the obtained cocktail, drink, long drink or similar and to be added to the latter, wherein said removable containers may be opened for example by means of guarantee plug closures, for example of known plugs used in pharmaceutics for diet products, integrators and similar. The membrane 6, which is to be thermowelded or glued to the lower end of the container having more bins 4 is illustrated separated.

Figure 19:
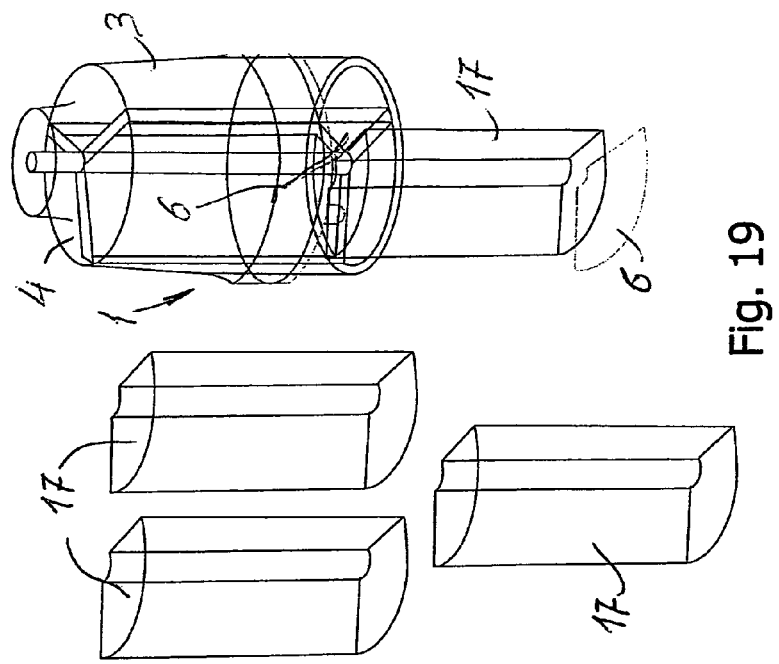
FIG. 19 shows the cover part with a multibin container formed by removable containers.

In FIG. 19 the shaker part with more bins 4, that is the cover 3, houses distinct removable bins 17, in the shown example three, as illustrated in the exploded view. Said removable bins 17 may be formed by cartridges made of tearable synthetic material containing the different spirits, integrators and similar. With this embodiments said cartridges may be separately bought by the user and the latter may so introduces into the shaker cartridges with the whisked ingredients and prepare the desired cocktails.

Reference is now made to a preferred embodiment of a disposable shaker according to the present invention shown in the FIGS. 20 to 25 in which assembling or pre-selling positioning means 20 are provided which allow an unambiguous guide or manipulation of the cover 3 during the movement for carrying out the perforation and the further tearing of the membrane 6 and obtaining a reliable seal during the mixing or shaking phase as well as an easy separation between the cover part 3 and the base part 2 of the shaker 1.

Said guided manipulation means 20 comprises:
1) in the base part 2:
   a respective positioning projection 21 near each tearing tooth 7 above the latter,
2) in the cover part 3, provided with said bins 4 delimited by an external piston-like cylindrical wall 22 having an upper annular closure flange 23 and a lower annular flange 24 on which latter said membrane 6 is sealed:
   an external annular crown 25, formed by a number of annular segments 26, which are separated at a distance from each other, corresponding to the number of said positioning projections 21 and having, between the opposite segment ends 26A,
   an axial strip-like stop 27 substantially placed in the middle and extending between the upper flange 23 and the lower side 26B of said annular segments 26, as well as
   at one side of said axial strip-like stop 27, a positioning wing 28 which radially projects from said cylindrical wall 22 for an amount which is smaller then the radial thickness of said segments 26, which positioning wing 28 may swing in the horizontal plane under a thrust action, and
   at the other side of said axial strip-like stop 27, a free transit passage 29 for a positioning projection 21 during the opening of the shaker 1.

In more details, and how inferable in particular from the FIGS. 21 to 25, said crown of annular segments 26 is placed at about the middle of the high of said cylindrical wall 22, wherein the distance between said oscillating wing 28 and the lower annular flange 24 is a little smaller than the distance between said positioning projections 21 and the points of said tearing teeth 7, such that in the assembled or selling position, in which the cover 3 is inserted into the base 2, between the points of said tearing teeth 7 and the membrane 6 is provided a distance S, FIG. 24. In this position it will therefore not be possible to carry out a rotational movement of the cover 3 either in the right-hand or in the left-hand direction of rotation because this will be hindered by the positioning projections 21 which lean against the above-lying wings 28 between an axial stop 27 and the end 26A of the adjacent annular segment 26. This position will practically be held by the external shaker film-like packaging, not illustrated, provided with a circumferential hand-tearable guarantee strip, as illustrated in the preceding embodiments, which strip is placed on the area between the upper part of the base 2 and the annular upper flange 23 of the cover 3.

30A denotes an annular rabbet step forming the bottom of an annular flange-like reduction 30B of the upper cylindrical part 30 of the base 2. The guided manipulation for carrying out the perforation and further tearing of the membrane under conditions of hermetic tightness and the following separation between the parts 2 and 3 of the shaker 1 takes place as follows:

After having pulled up a part or guarantee strip, non shown, covering the union area between cover 3 and base 2 on the cover 3 is manually carried out an axial pressure or thrust so that the positioning projections 21 causes the swingable wings 28 to swing upwards and after the overcoming of said wings 28, FIG. 24, said positioning projections 21 will be in a position between the annular top flange 23 of the cover and the upper side of said annular projecting segments 26, wherein said stroke of the piston-like cover 3 causes the initial perforation of said membrane 6, FIG. 25, and will end with the abutment of the external circumferential area of said membrane 6 against the rabbet step 30A with a subsequent is substantially tightly separation between the internal chamber of the base 2, receiving the cocktail ingredients, and the cover part 3, FIG. 25.

From this position, after having carried out the shaking phase, the cover 3 can then be rotated in a guided manner only in one rotation direction because a rotation in a contrary rotation direction is hindered by the axial stop 27 adjacent to the respective swingable wing 28. During the rotational movement of the cover 3 will take place a progressive tearing of the membrane 6 with following prompt and complete fall of the different cocktail components from the bins 4 into the base part 2.

The rotational movement of the cover 3 will then be interrupted by the abutment of the positioning projections 21 against the next axial stop 27 in the possible rotation direction, that is in the illustrated example with three tearing teeth 7, after a rotation of 120°. In this position said positioning projections 21 will be above the mentioned transit passages 29 which allow a free lifting of the cover 3 and the separation thereof from the base 2 containing the prepared cocktail ready to be drunk.

Whit this embodiment the mixing or shaking manipulation can be carried out in each intermediate rotational position of the cover 3 practically under tightly conditions.

Figures 20, 22:
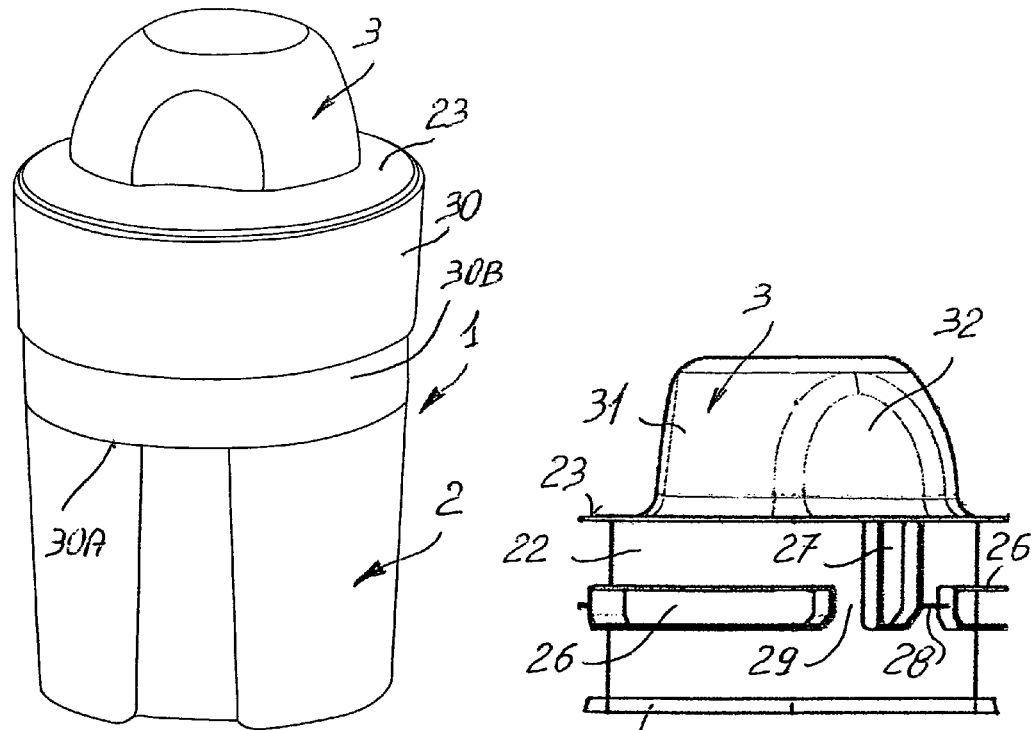
FIG. 20 shows in a perspective view a preferred embodiment of a disposable shaker according to the invention.
FIG. 22 shows a lateral view of the upper cover part of the shaker of the FIGS. 20 and 21.
Figure 23:
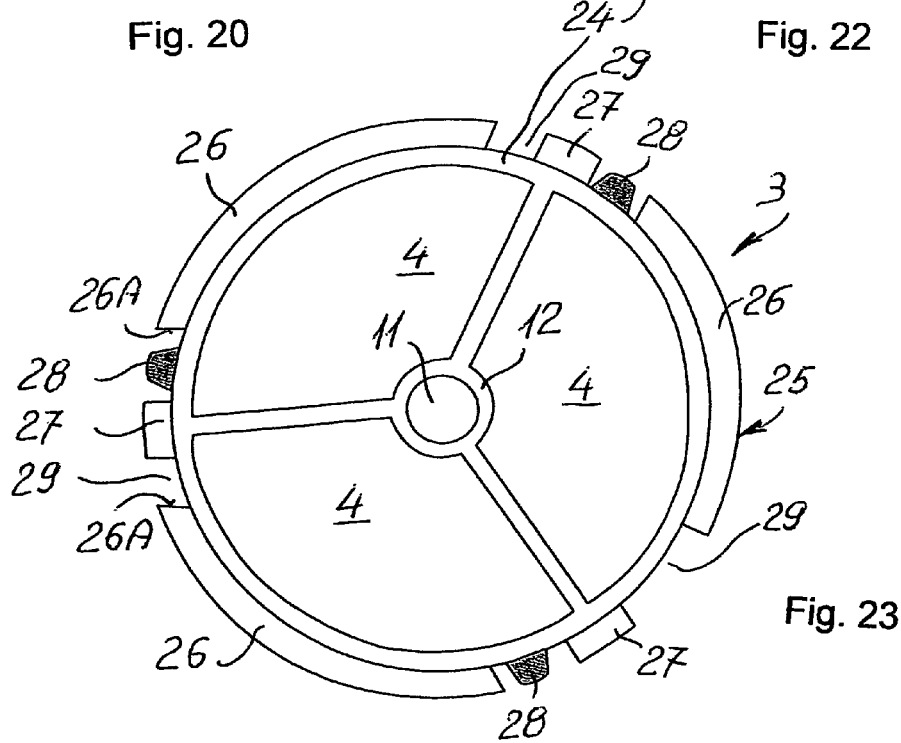
FIG. 23 shows a bottom view of the cover part of FIG. 22 without the illustration of the top flange for better understanding purposes.

In the FIGS. 20 and 22 with the reference number 32 is indicated one of three flattenings provided on the dome 31 at a reciprocal distance of 120° which serve to determine the correct position between cover 3 and base 2 during the automatic assembling phase, is wherein the number of said flattenings 32 corresponds to the number of the provided tearing teeth 7.

Practically the thrust action on the cover 3 for tearing the membrane 6 can simply take place by applying with one hand a blow onto the flattened top of the cover 3 of said shaker which is for example supported on a table or held in the other hand in order to cause a sliding of said positioning projections 21 on said swingable wings 28 with the following tearing of the membrane 6 and abutment of the latter on the abutment step 30A.

Due to sturdiness purposes the base 2 could be provided with grooves, as indicated in FIG. 20, as well as with ribs at will.

Figures 21, 26:
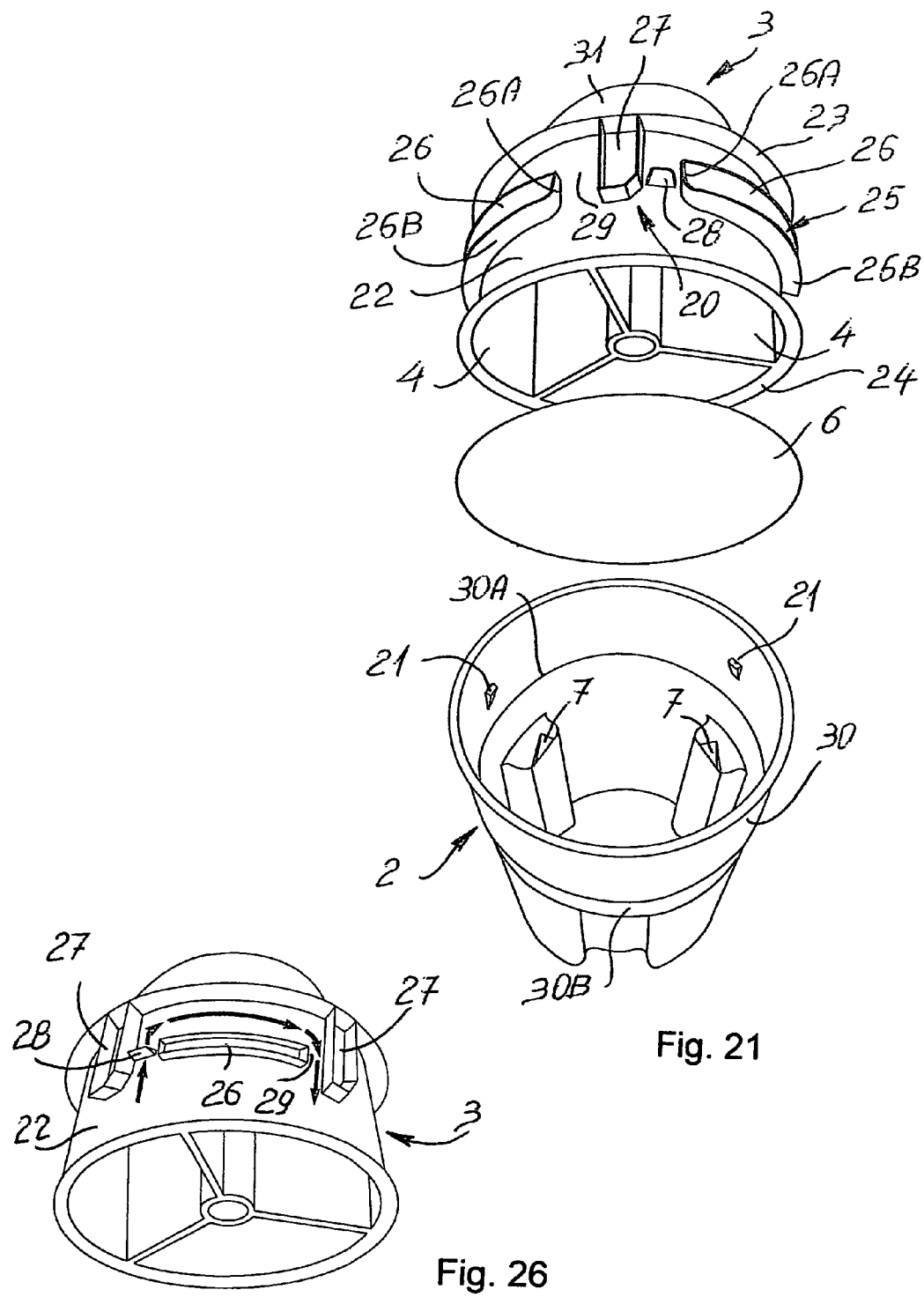
FIG. 21 shows, in an exploded view, the shaker of FIG. 20.
FIG. 26 shows a perspective view of the cover part illustrating the path of a positioning projection during the manipulation of perforation/tearing of the membrane and opening of the shaker after the mixing for the preparation of the cocktail.

The manipulation path comprising a vertical stroke for the initial tearing of the membrane 6, an horizontal stroke for the further membrane tearing, and the vertical separation stroke for the separation of the cover 3 illustrated with arrows in FIG. 26 could obviously be substituted by a partial helicoidal path, for example as provided for bayonet closures or similar. Similarly could be provided an inverted disposition of the bins 4 and the teeth 7, that is with said bins in the base 2 and the perforation/tearing teeth in the cover 3.

From the above structural and functional description of the several shaker embodiments it is readily apparent that with the several proposed shakers, the indicated aim is effectively accomplished and the aforementioned advantages are obtained.

It lies within the scope of the invention to conform further shakers having a combination at will of the features shown is in the several shaker embodiments disclosed above as well as to substitute single parts or components with other functionally equivalent parts or components.

In practicing the invention those skilled in the art may introduce modifications and variants concerning, for example, structural coupling details between the shaker cover and base parts, the form and disposition of the tearing teeth, a different number of bins, the use of specific synthetic materials, and so on, without thereby departing from the scope of the present invention as claimed in the appended claims.

The invention claimed is:

1. A disposable shaker comprising:
a cup-like base part (2); and
a cup-like cover part (3) which are removably joinable together with an axial snap engagement or with a rotatable engagement,
wherein one of said cover (3) or base (2) houses or forms a multibin container (9) which is capable of being tightly closed by means of a membrane (6) and serves for housing the single ingredients of a cocktail or liquid mixture to be prepared,
wherein tearing teeth (7) for tearing said membrane (6) during said engagement between said cover part (3) and said base part (2) are provided,
wherein said membrane (6) closing said multibin container (3; 2) is fixed to the latter, and in that said tearing teeth (7) for tearing said membrane (6) are formed in one-piece with in said base part (2) or cover part (3) and having tearing points near said membrane (6) in the closed or assembled position of said shaker (1) so that at least one of an axial and rotational mutual translation movement between said cover (3) and base (2) causes a penetration of said tearing teeth (7) into said membrane (6) with a consequent known tearing of the latter (6) and transfer of the cocktail ingredients, which are directly or indirectly contained in the bins (4) of said cover (3) or base (2), into the respective other mixing part (2; 3) of said shaker (1) for the mixing or shaking of said ingredients into said shaker,
further comprising an unambiguous manipulation means (20) for the membrane (6) perforation and tearing movements and the opening movements of the shaker (1) after the shaking or agitation manipulation, wherein said unambiguous manipulation means (20) for the membrane (6) perforation and tearing movements and the opening movements of the shaker (1) comprise:

1) in the base part (2):
   a positioning projection (21) near each tearing tooth (7) above the latter,
2) in the cover part (3), provided with said bins (4) delimited by an external piston-like cylindrical wall (22) having an upper annular closure flange (23) and a lower annular flange (24) on which latter said membrane (6) is sealed:
   an external annular crown (25), formed by a number of annular segments (26) which are separated at a distance from each other, which number of segments (26) corresponds to the number of tearing teeth (7), wherein between the opposite segment ends (26A) are provided:
   an axial strip-like stop (27) substantially placed in the middle and extending between the upper flange (23) and the lower side (26B) of said annular segments (26), as well as
   at one side of said axial strip-like stop (27), a positioning wing (28) which radially projects from said cylindrical wall (22) for an amount which is smaller then the radial thickness of said segments (26), which positioning wing (28) may swing about the horizontal plane under a pushing action, and
   at the other side of said axial strip-like stop (27), a free transit passage (29) for a positioning projection (21) during the opening of the shaker (1).

2. The shaker according to claim 1, further comprises at least one tearing tooth (7) for each bin (4) of said cover (3) or base (2).

3. The shaker according to claim 1, wherein said tearing teeth (7) are formed on the lateral internal wall or on the bottom (12) of said base (2) or cover (3).

4. The shaker according to claim 1, wherein a middle axial column (12) of said cover (3) is provided an axial hole (11) and also in said membrane (6) is provided a middle axial hole through which holes a straw (10) may be conducted and inserted into said shaker (1).

5. The shaker according to claim 1, wherein said cup-like base (2) is formed like a tea-cup or espresso-cup and is provided with a projecting handgrip (13).

6. The shaker according to claim 1, wherein the base (2) is like a container having several bins (4) and said tearing teeth (7) are provided in said cover (3), wherein said shaker (1) has an enlarged bottle-like conformation and at the top of said cover (3) is provided a plug (15) which may contain an integrator component which is manually releasable by the user.

7. The shaker according to claim 6, the shaker has a conformation of a flat bottle.

8. The shaker according to claim 6, wherein said bins (4) said ingredients are contained in cartridges (17), wherein said cartridges are made of tearable synthetic materials.

9. The shaker according to claim 1, with a cover (3) and a base (2) having coupling means which are movable by means of a thread, rotation or pushing engagement, further comprising one of a guarantee tongue and a narrow band which is obtained from the shaker packaging or covering film and partially covers both said cover (3) and said base (2).

10. The shaker according to claim 1, wherein the rotatable engagement is a thread engagement.

11. A disposable shaker comprising:
   a cup-like base part (2); and
   a cup-like cover part (3) which are removably joinable together with an axial snap engagement or with a rotatable engagement,
   wherein one of said cover (3) or base (2) houses or forms a multibin container (9) which may be is capable of being tightly closed by means of a membrane (6) and serves for housing the single ingredients of a cocktail or liquid mixture to be prepared,
   wherein tearing teeth (7) for tearing said membrane (6) during said engagement between said cover part (3) and said base part (2) are provided,
   wherein said membrane (6) closing said multibin container (3; 2) is fixed to the latter, and in that said tearing teeth (7) for tearing said membrane (6) are formed in one-piece with in said base part (2) or cover part (3) and having tearing points near said membrane (6) in the closed or assembled position of said shaker (1) so that at least one of an axial and/or and rotational mutual translation movement between said cover (3) and base (2) causes a penetration of said tearing teeth (7) into said membrane (6) with a consequent known tearing of the latter (6) and transfer of the cocktail ingredients, which are directly or indirectly contained in the bins (4) of said cover (3) or base (2), into the respective other mixing part (2; 3) of said shaker (1) for the mixing or shaking of said ingredients into said shaker,
   wherein the base (2) is a container having several bins (4) and said tearing teeth (7) are provided in said cover (3), wherein said shaker (1) has an enlarged bottle-like conformation and at the top of said cover (3) is provided a plug (15) which may contain an integrator component which is manually releasable by the user,
   wherein said container (2; 3) having more bins (4) is housed a further removable container (16) which may be opened by means of a guarantee plug and contains, an integrator component, a component conferring fluorescence to the obtained drink.

12. The shaker according to claim 11, wherein said container (2; 3) having more bins (4) is provided with an internal positioning skeleton housing single removable containers (17).

* * * * *